United States Patent
Hennen

[11] 3,879,227
[45] Apr. 22, 1975

[54] BATTERY VENT PLUG
[75] Inventor: Roy Erving Hennen, Mequon, Wis.
[73] Assignee: Globe-Union Inc., Milwaukee, Wis.
[22] Filed: Dec. 10, 1973
[21] Appl. No.: 423,055

Related U.S. Application Data
[63] Continuation-in-part of Ser. No. 354,514, April 26, 1973, abandoned, which is a continuation-in-part of Ser. No. 236,461, March 20, 1972, abandoned.

[52] U.S. Cl. .................................. 136/177; 136/179
[51] Int. Cl. ............................................ H01m 1/06
[58] Field of Search ..................... 136/170, 177, 179

[56] References Cited
UNITED STATES PATENTS

| | | | |
|---|---|---|---|
| 2,670,396 | 2/1954 | Field .................... | 136/177 |
| 3,369,940 | 2/1968 | Slautterback ............ | 136/177 |
| 3,466,199 | 9/1969 | Hennen ................. | 136/177 |
| 3,507,708 | 4/1970 | Vignaud ................ | 136/177 |
| 3,597,280 | 8/1971 | Hennen ................. | 136/177 |

FOREIGN PATENTS OR APPLICATIONS
839,808   3/1939   France ................. 136/179

*Primary Examiner*—Donald L. Walton
*Attorney, Agent, or Firm*—James L. Kirschnik; John Phillip Ryan

[57] ABSTRACT

A vent plug for a storage battery which contains baffles to retain the electrolyte while affording egress of cell vent gases through a porous diffuser contained in a first compartment immediately adjacent a second compartment contiguous the gas outlet. In one embodiment, a gang type plug assembly has floors in the base portion of the assembly and are pitched or gabled to afford maximum drainback of electrolyte and tubular passages terminating in a pointed wall and located above the usual cell vent opening in the battery provide for efficient drainback. The entire multiple vent plug assembly is hermetically sealed so as to provide maximum venting of the gases through the filter while at the same time, affording a tamper proof unit. In another embodiment, a single vent plug is provided with the two compartments and the second compartment located over the compartment containing the diffuser.

21 Claims, 17 Drawing Figures

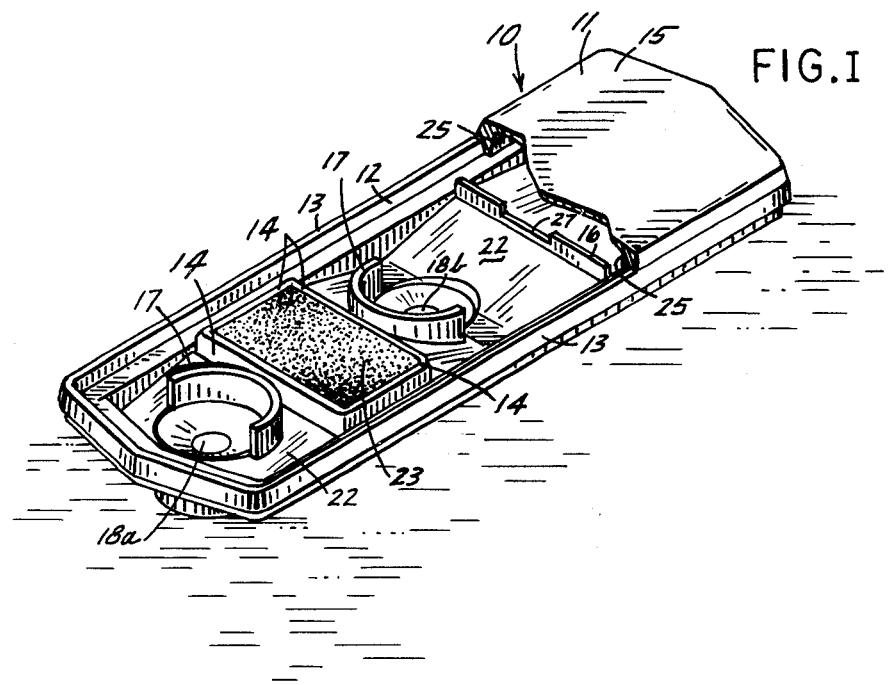
FIG. I
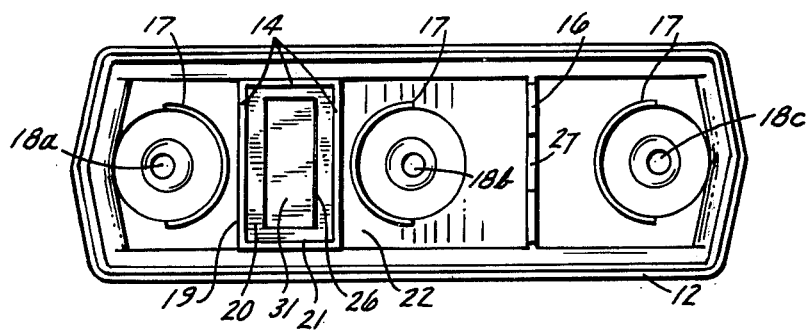
FIG. II
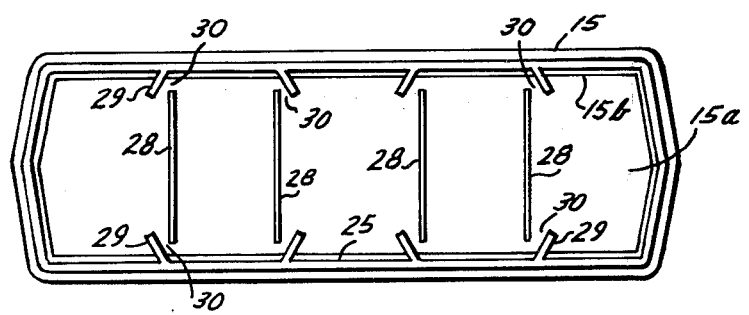
FIG. III

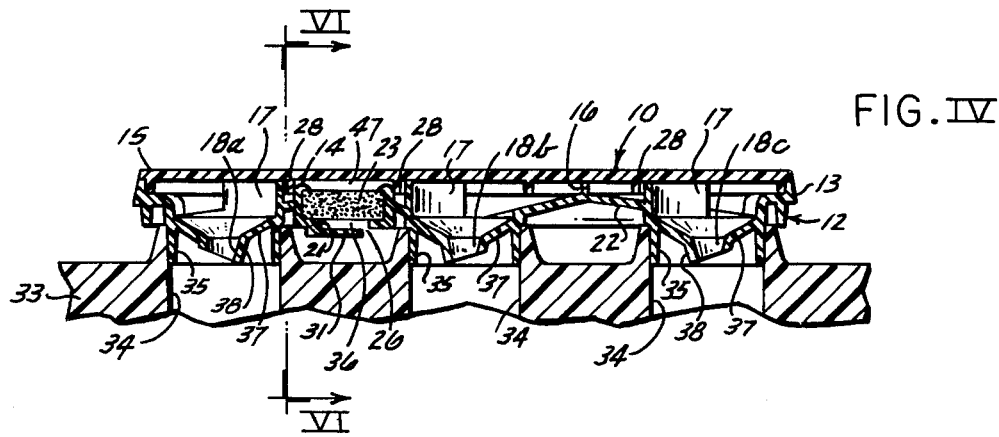
FIG. IV
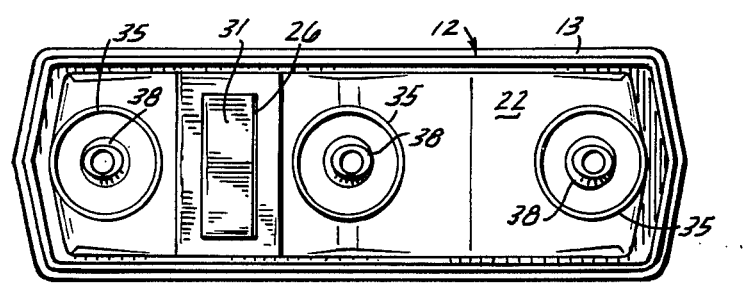
FIG. V
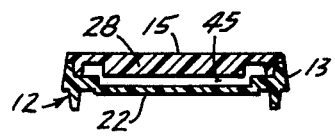
FIG. VI
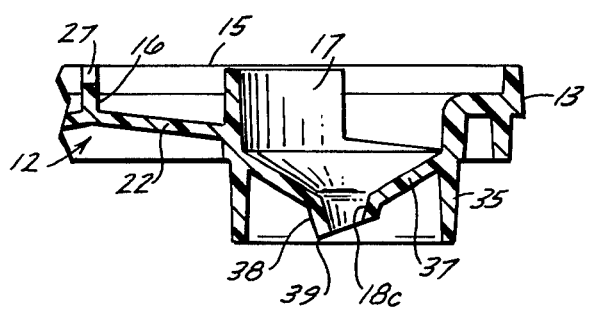
FIG. VII

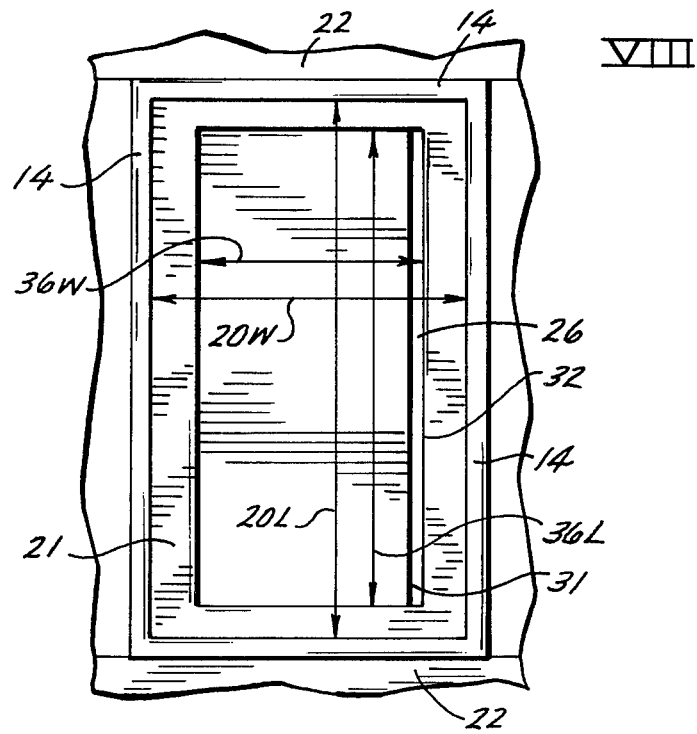
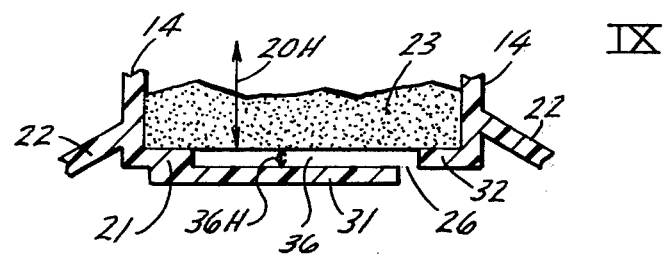
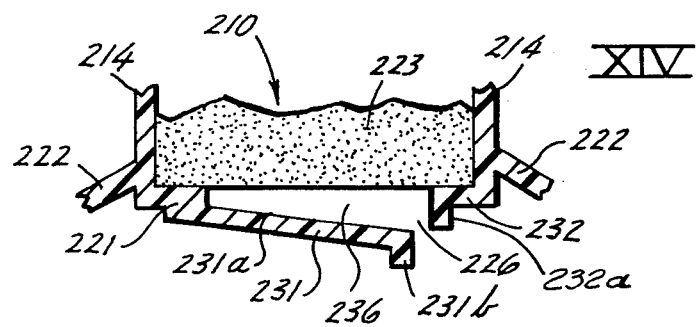

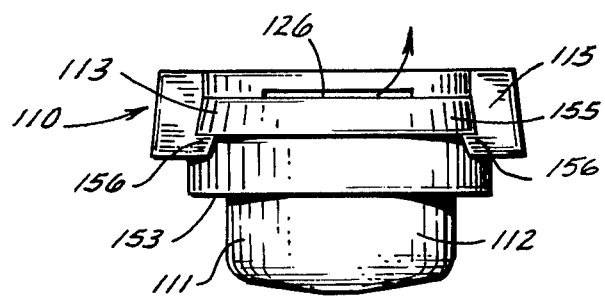
FIG. X
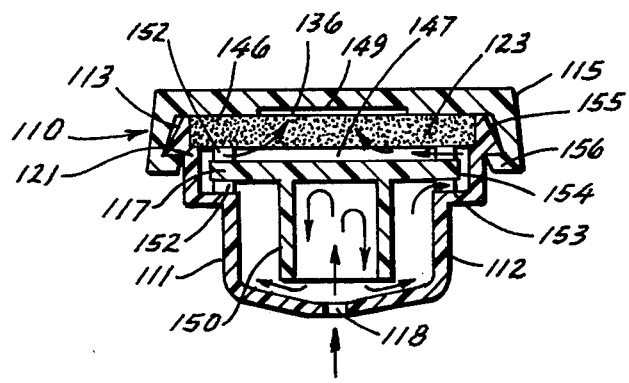
FIG. XI
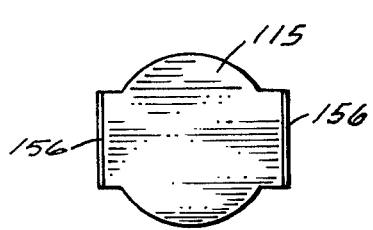
FIG. XII
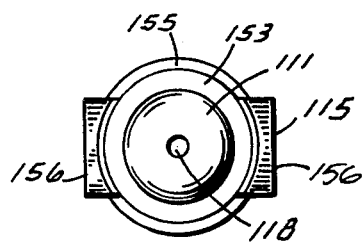
FIG. XIII

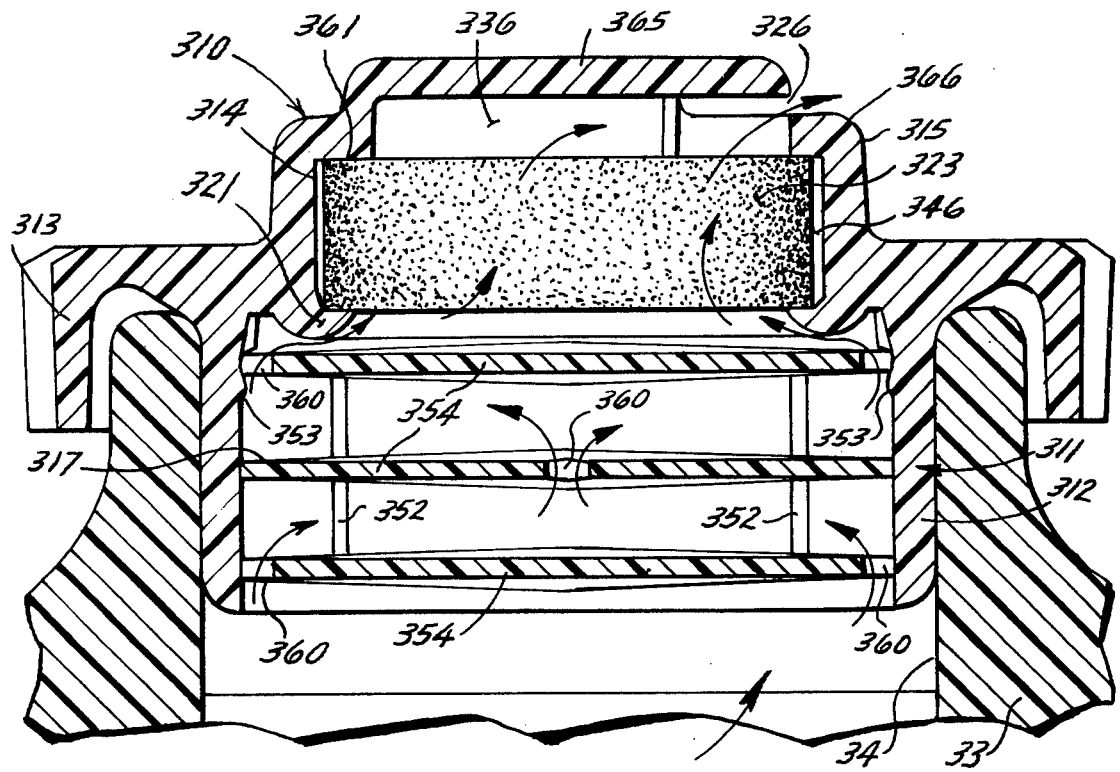
FIG. XV
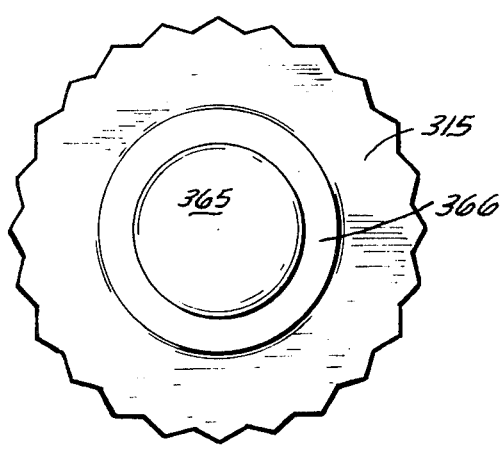
FIG. XVI
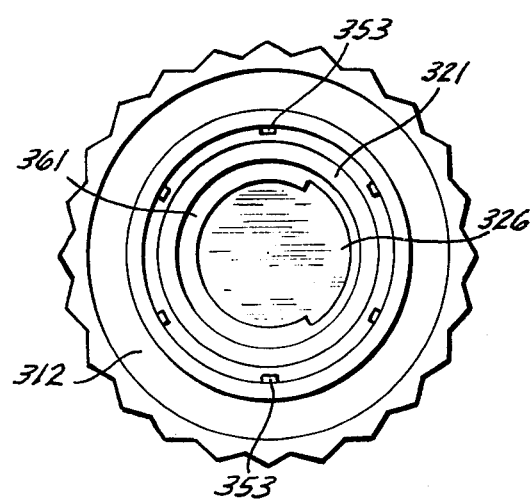
FIG. XVII

1

BATTERY VENT PLUG

CROSS REFERENCE TO RELATED APPLICATIONS

This application is a continuation-in-part of my earlier application U.S. Ser. No. 354,514, filed Apr. 26, 1973, now abandoned which is a continuation-in-part of my previous application U.S. Ser. No. 236,461, filed Mar. 20, 1972, now abandoned.

BACKGROUND OF THE INVENTION

This invention relates to a vent plug for storage batteries and, more particularly, to an improved vent plug which affords maximum venting of the cell gases in a manner to reduce explosion hazards while at the same time reducing the loss of electrolyte.

The filling of battery cells with water to provide adequate electrolyte and to prevent accumulation of gases during the charging and discharging of a battery have always been a problem in the storage battery industry. Gang type multiple vent plug assemblies which afford some degree of quick access to the cells in a storage battery and venting of the cells are common in the industry. For example, in U.S. Pat. No. 3,597,280 a multiple vent plug assembly is disclosed which does afford electrolyte retention either from a vaporous electrolyte condensing in the plug assembly or spill proof features should the battery be tilted substantially from a horizontal plane. Raised floor sections are disclosed in U.S. Pat. No. 3,369,940 for a multiple vent plug assembly for the purpose of draining back escaped electrolyte and an open type slotted vent for a multiple vent plug assembly is illustrated in U.S. Pat. No. 3,265,538 as well as in U.S. Pat. No. 3,284,244.

There is not currently available a vent plug and particularly a multiple vent plug assembly for a storage battery which provides for maximum diffusion of gases to the atmosphere to reduce possible explosion hazards while at the same time affording positive retention of electrolyte in those instances where the battery is not maintained on a horizontal plane. Neither is there available a gang type plug for battery cell vent openings wherein positive drainback of electrolyte is accomplished even when a very small amount of electrolyte is present in the plug assembly.

It is an object of the present invention to provide a novel vent plug for a storage battery which affords maximum venting of gases emitted from a battery cell and in a manner to reduce explosion hazards. It is another object of this invention to provide a multiple vent plug assembly for a battery which includes means to effect maximum retention and drainback of the electrolyte. It is still another object of the present invention to provide a vent plug for a storage battery which includes a microporous filter for diffusing gases prior to emission from inside the vent plug. It is yet another object of this invention to provide a vent plug assembly for a storage battery which is easily fabricated and hermetically sealed in a manner to prevent tampering with the diffusion element.

SUMMARY OF THE INVENTION

The foregoing objects are accomplished and the shortcomings of the prior art are overcome by the present vent plug for a storage battery wherein a porous diffuser is disposed in a hollow body member having a first chamber and adjacent a second compartment to prevent accumulations of and afford diffusion of cell gases after their egress from the battery. In one embodiment a plurality of partition means is provided in a hollow body member forming a gang type vent so as to permit the flow of gases to a single porous diffuser while at the same time retarding the flow of electrolyte. In the gang type vent, the floor of the hollow member is gabled and tubular members adjacent the cell vent openings are designed at an oblique angle so as to afford maximum drainback of escaped electrolyte. In an alternative embodiment, the diffuser is disposed in a chamber in a single, hollow body member and adjacent a second compartment with an outlet.

BRIEF DESCRIPTION OF DRAWINGS

A better understanding of the present plug assembly will be accomplished be reference to the drawing wherein:

FIG. I is a perspective view of a preferred embodiment of this invention showing a multiple vent plug assembly with a portion broken away to show the inside of the assembly.

FIG. II is a top plan view of the plug assembly with the cover removed.

FIG. III is a bottom plan view of the cover illustrating the baffles.

FIG. IV is a view in vertical section of the multiple vent plug assembly engaged on a typical battery cover.

FIG. V is a bottom view of the multiple vent plug assembly.

FIG. VI is a view in vertical section taken along line VI—VI of FIG. IV.

FIG. VII is a partial view in vertical section of one of the tubular vent closures illustrating the novel drainback aspect.

FIG. VIII is a partial top view of the two compartments and the slot in the multiple vent plug assembly indicating the dimentions for compartments and the slot.

FIG. IX is a partial view in vertical section illustrating the heights of the two compartments and showing a portion of the diffuser in one of the compartments.

FIG. X is a view in side elevation illustrating a single vent plug constructed according to this invention.

FIG. XI is a view in vertical section of the vent plug shown in FIG. X and illustrating the flow path of cell gases therethrough.

FIG. XII is a top plan view of the vent plug shown in FIG. X.

FIG. XIII is a bottom view of the vent plug shown in FIG. X.

FIG. XIV is a partial view of still another embodiment of a multiple vent plug assembly constructed according to this invention.

FIG. XV is a view in vertical section of a further embodiment of a single vent plug illustrating the flow path of cell gases therethrough.

FIG. XVI is a top plan view of the single vent plug shown in FIG. XV.

FIG. XVII is a bottom view of the vent plug shown in FIG. XV with the baffle removed.

DESCRIPTION OF THE PREFERRED EMBODIMENT

Proceeding to a detailed description of the present invention, the multiple vent plug assembly, generally 10, is comprised of a hollow body member 11 composed of a base 12 with peripheral upstanding sidewalls 13 and a cover 15. Base 12 has four upstanding wall sections 14 in the form of a rectangular frame 19 surrounding a ceramic porous diffuser 23 and extending slightly above the diffuser for later melting and mashing over the adjacent edges of the diffuser. Partition means including an upstanding and generally linear partition or baffle 16 as well as semicircular skirt type baffles 17 are also disposed in base 12. Each skirt type partition 17 partially surrounds three cell vent openings 18a, 18b and 18c.

Referring specifically to FIG. II, it will be seen that a rectangular compartment 20 is formed between two of the cell vent openings 18a and 18b, by frame 19 with a rectangular, peripheral support landing 21 for diffuser 23. This landing will surround rectangular slot 26 formed through floor 22 of base 12 and lower base wall 31 which is designed from a polypropylene material and of a size to flex for purposes to be explained in the Operation. In final fabrication, landing 21 is covered by the porous ceramic diffuser 23 which is of larger dimension than slot 26 as shown in FIGS. I and IV. The preferred width of slot 26 is .030 inch. However, it can be reduced to .020 inch or enlarged to .040 inch if desired, provided the indicated pore size for diffuser 23 is employed.

It will be noted in FIG. I that the floor 22 in base 12 is pitched in a gable-like manner with the cell vent openings 18a–c located at the lowermost portion of the gable and walls 14 and partition 16 positioned at the uppermost area. It should also be noted that the porous ceramic diffuser 23 is also located at the upper elevation of floor 22. For purposes as will be explained later in the Operation, wall sections 14 which are adjacent to porous stone 23 will later be crimped thereover and terminate a short distance from the upper edge of sidewalls 13 of base 12. A distance is therefore provided between the inside wall of cover 15, walls 14 and the upper surface of diffuser 23. In the instance of partition 16 between openings 18b and 18c, it will be seen that a U-shaped notch 27 is centrally disposed. Referring to FIG. VII, it will be seen that the tubular members which form cell vent openings 18a–c terminate at an oblique angle and, in effect come to a point such as shown at 39.

In FIG. III, it will also be seen that there are two pairs of spaced linear baffles 28 extending traversely from the inside wall 15a of cover 15 and four pairs of smaller linear baffles 29 extending from the inner sidewalls 15b of cover 15 and adjacent the ends of baffles 28 to afford passages 30. Baffles 28 and 29 are spaced to be accommodated between partitions 16 and 17 and walls 14 in base 12.

As illustrated in FIG. IV, the multiple vent plug assembly is shown in an operative position on a battery cover indicated by the numeral 33 having the usual filling ports 34. Annular vent closure members 35 extend from the floor of base 12 and sealably engage the walls of filling ports 34. Also tapering downwardly from floor 22 in base 12 are bottom portions 37 which terminate in tubular-like members 38. Diffuser 23 rests on landing 21 and above lower floor 31 to provide a second compartment 36 below diffuser 23 and adjacent rectangular slot opening 26. A preferred volume for compartment 36 is .0124 cubic inch with a vertical cross sectional area of .035 square inches. However, the volume of the compartment 36 could be increased to .050 cubic inch. The size of slot 26 is smaller than the cross sectional area of compartment 36 but is of large enough dimension to permit an ignition of gases in the compartment to effect a controlled rapid expansion to extinguish any flame without destruction or damage to vent plug assembly 10. This important design of the slot 26 in relation to the compartment 36 is effected by employing preferably a rectangular slot 26 having a width of .030 inch and a cross sectional area of .0237 square inch. To effect the controlled rapid expansion of gases in compartment 36 it has been found that a relationship exists between the size of slot 26 in terms of area and the volume of compartment 36 (as measured by dimensional arrows 36L × 36W × 36H shown in FIGS. VIII and IX) which ranges from 2:1 to 0.5:1 where the numeral "1" in the indicated range represents the slot size. An additional important factor although not as critical as the relationship of slot 26 to compartment 36 is the open pore volume of diffuser 23 as compared to the volume of compartment 36. In most instances where diffuser 23 is of relatively small cross sectional area but of relatively large height, the open pore volume will range from one-half to twice the volume of compartment 36. The open pore volume of diffuser 23 would be the size of chamber 20 when fully occupied by diffuser 23 (as measured by dimensional arrows 20W × 20L × 20H shown in FIGS. VIII and IX) minus the actual volume of the material composing diffuser 23.

DESCRIPTION OF THE ALTERNATIVE EMBODIMENTS

In FIGS. X–XIII, a single vent plug 110 is disclosed employing the two compartments with a porous diffuser in one of the chambers. Vent plug 110 will engage a filling port 34 of a battery cover 33 in a similar manner as for vent plug assembly 10. Similar numbers are indicated for similar parts as in gang type vent 10 except they will be numbered in the "100" series. The single vent plug 110 has a hollow, generally cylindrical body 111 composed of a base 112 with a peripheral sidewall 113. A cap-like cover 115 engages sidewall 113 and is fabricated with a U-shaped indentation 149 to form second compartment 136 and, at the same time, two diametrically opposite slots one of which is shown at 126. A porous diffuser 123 is positioned at the top of hollow body 111 on a landing 121 and inside wall 113 which, with cover 115, form a compartment 146 for diffuser 123. A generally T-shaped, tubular baffle or partition means 117 is disposed inside hollow body member 111 with the tubular portion 150 spaced from cell vent opening 118. Baffle 117 is supported by means of spacers 152 resting on shoulder 153 and supporting circular portion 154 which is spaced from sidewall 113. Spacers 152 also serve to support porous diffuser 123. It will be noted that cover 115 engages sidewall 113 by means of annular projecting flange 155 extending from sidewall 113 and flanges 156 extending from cover 115. This is effected by a snap fit arrangement.

In FIG. XIV, a further modification of a multiple vent cap assembly 210 is shown which is identical to assembly 10 except for modifications to one of the chambers. Similar numbers will be indicated for similar parts except they are numbered in the "200" series. In unit 210, lower floor 231 for chamber 236 is formed with a slanted floor surface 231a which tapers downwardly toward slot 226. It will also be noted that floor 231 has an extending portion 231b which is positioned outwardly from floor 231 and away from slot 236. Extending portion 231b, in effect, provides an extension for slot 226 for purposes as will be explained later in the Operation.

FIGS. XV – XVII illustrate still a further embodiment of a single vent plug 310 employing a single elongated and radial slot 326. Similar numbers are indicated for similar parts as in gang type vent 10 and the single vent plug 110 with the double slots, except they will be numbered in the "300" series. Single vent plug 310 as is true of single vent plug 110 has a hollow, generally cylindrical body 311 composed of a base 312 with a peripheral side wall 313. Base 312 engages a filling port 34 of a battery cover 33 with side wall 313 extending to the outside. A porous diffuser 323 preferably of a porous polypropylene is housed in a compartment 346 in cover portion 315. Compartment 346 is formed from a supporting landing 321, an inset wall portion 314 and an upper wall 361. The second compartment 336 is provided in cover portion 315 beneath rounded top 365 and is in communication with diffuser 323 and outlet 326. Top 365 and cover portion are joined by shoulder 366. A baffle 317 is carried inside of hollow body member 311 by means of annular ridge 353. Baffle 317 is composed of three similar disc portions 354 with openings indicated at 360 for permitting cell gases to pass through baffle 317 in a tortuous path. Spacers 352 serve to support and separate the three disc portions 354.

The same critical and important dimensional aspects concerning the size of slots 126, 226 and 326 in relation to compartment volumes 136, 236 and 336 respectively, as well as the open pore volumes of diffusers 123, 223 and 323 in relation to their respective compartments, pertain as described for the multiple vent 10. It should be pointed out that the dimensions for the slots 26 and 326 and chamber volumes for the diffusers 23 and 326 in units 10 and 310, respectively, are substantially the same as they pertain to a single slotted device. Concerning the double slots 126 in unit 110, these will preferably have a width of .025 inch and a cross sectional area of .0104 square inch. A preferred volume for compartment 136 is .008 cubic inch with a vertical cross sectional area of .035 square inch. In most instances the preferred open pore volume of diffuser 123 is approximately .019 to about .0264 cubic inch or one-sixth of the volume of the diffuser.

OPERATION

A better understanding of the advantages of the multiple vent plug assembly 10 will be had by a description of its operation. Cover 15 and base 12 will be molded in a usual manner from a polymeric material such as a thermoplastic polypropylene to form the various partitions, walls and baffles 14, 16 and 17, cell vent openings 18a, 18b, and 18c, plug members 35 and tubular members 38 as well as baffles 28 and 29 in cover 15. The porous diffuser 23 will be inserted between wall sections 14 and frame 19 as shown in FIG. I. A hot platen would then be used to melt the walls 14 down to ceramic level. The molten plastic would be forced into the porous ceramic forming a seal. The cover 15 will then be sealed to base 12 in any suitable manner such as by ultrasonics to form a hermetic seal and a vent plug assembly with the hollow body 11. When the vent plug assembly 10 is placed on a battery cover 33 and the plug members 35 sealingly engage filling ports 34 in a gas tight manner, any escaped electrolyte whether caused by condensation inside the hollow body 11 or by a tilting of the battery will be impeded by baffles 16, 17, 28 and 29 subsequently be directed back into the filling port 34 through the pitched floor 22 of base 12, the taper of bottom portions 37 and the tubular members 38. Even the smallest amount of electrolyte will be directed back into ports 34 because of the pointed-like endwall 39 of the tubular members 38 which will obviate any bridging of the electrolyte across the tubular member by reducing the capillary action and surface tension of the electrolyte on the tubular wall surface. All cell vent gases which normally form during charging and discharging of a battery will be afforded venting ultimately through rectangular slot 26. However, an indirect route will be effected so as to prevent any entrained electrolyte from coming in contact with the porous diffuser 23. The cell vent gases will pass around the ends of the skirt partitions 17 and between the lateral spaces provided between baffles 16, 28 and 29. Some space will be provided between floor 22 of base 12 and baffles 28. This is shown specifically in FIG. VI and the passage as indicated by the numeral 45. In the instances of baffle 16 between cell vent openings 18b and 18 c, the additional U-shaped notch 27 affords additional flow of the cell vent gases. It should be noted, however, that no such central notches are provided in the other linear type baffles 28. When cover 15 is placed over porous diffuser 23, a small spacing as indicated by the numeral 47 is formed between it and cover 15 to permit gas to flow through diffuser 23, compartment 36 and ultimately out through slot 26. Thus, any cell vent gases before being vented to the outside of the vent plug assembly 10 will be routed around the ends of baffles 17 as well as around the ends and under baffles 28 and 29 before contacting diffuser 23 through the upper surface by means of spacing 47.

In actual tests, a battery when subjected to a high charging rate, and a spark induced at outlet 26 failed to produce an explosion. The major factor for this is the combined use of the diffuser 23 and the underlying compartment 34. As the gases vent into the chamber 36 and ultimately out through opening 26, any flame or spark igniting the gases will cause a harmless explosion in chamber 36 because of the small volume and the outward flexing of floor 31. However, the force of the explosion is enough to momentarily overcome the force of the venting gases stopping the flow and extinguishing the flame. This design of chamber 36 in conjunction with slot 26 as well as the outward flexing of chamber 36, in effect, provides a shut-off valve which operates automatically in the presence of sparking or flame. It has also been found that in place of a slot type opening 26, a round hole centrally positioned in floor 31 can be employed in which instance floor 31 would extend completely across the undersides of landing 21. However, this is disadvantageous in that the open area is relatively inflexible and therefore the correct operational balance between chamber volume and venting cross sectional area is extremely critical. A single hole is also susceptible to being obstructed and the edges vulnerable to ignition from the heat concentrated thereby from the outward flow of gases following explosion in chamber 36.

It will also be recognized that under actual service conditions, dirt and other foreign material may tend to come in contact with the diffuser 23. However, much of this hazard is eliminated by having the diffuser covered such as by cover 15 with the opening to the outside being at the bottom of the plug assembly.

The operation of modified vent cap assembly 210 is the same as previously described for assembly 10 concerning the flow of gases through it. However, modified unit 210 has certain advantages in that tapered floor 231*a* will direct the expansion of any gases caused by ignition out through slot 226 because of it being pitched toward slot 226. Further, should any flame be caused, the increased surface area of extension 231*b* will allow the flame to flash over a large area without concentrating in the slot 226 immediately between the extreme lower lip of 232*a* of flange 232 and floor 231.

The operation of single vent caps 110 and 310 is basically the same as for multiple vent assembly 10 concerning the extinguishing of any flame caused by the ignition of cell gases. Concerning unit 110 and with base 112 engaging the vent opening of a storage battery, gases as well as entrained electrolyte will enter cap 110 through opening 118 and move in the direction of the arrows shown in FIG. XI. Most of any liquid electrolyte will engage tubular portion 150 and be returned to the battery through opening 118. Gases and any residual electrolyte will move upwardly along the outside of tubular portion 150 and around baffle 117. At this point the flow of substantially all of the electrolyte will be stopped by baffle 117 and the gases will proceed around the edge of baffle 117, by means of spacers 152, up through porous diffuser 123, into compartment 136 and out to the atmosphere through openings 126. Should a spark occur at this stage, a rapid expansion of the gases will take place in compartment 136 with the force of the expansion being aleviated by openings 126. With the sudden expansion of the gases in chamber 136 any flame will be extinguished. Ignition of gases inside body 111 will be prevented by porous diffuser 123.

As the baffling is different in vent cap 310 from unit 110 the flow of cell gases will be different as shown by the arrows. However, the functioning of compartment 336 as a flame extinguishing means will be the same as described for compartment 36 in multiple vent cap 10.

A porous diffuser 23 is described for placement in a compartment 20. The material is a porous stone and is available from any manufacturer of ceramic filters upon specification of particle size, percentage of open volume and base materials. Preferred materials for the manufacture of porous stone diffuser 23 are alumina, silica or alumina/silica natural and processed mineral grains with a glass binder having an 18–45% open volume and a particle size ranging from U.S. standard mesh 45 to 100. As indicated in single vent cap 310, microporous polypropylene is employed. It can be treated with a flame retardant material and used in place of the porous stone. Further, the described porous stone or microporous polypropylene can be interchangeably used in units 10, 110, 210 or 310. In place of microporous polypropylene, other microporous polyolefin materials can be employed such as polyethylene also treated with a flame retardent for diffuser 23, 123, 223 or 323. The base 12 and cover 15 with all of their contingent partitions, wall sections and tubular portions are fabricated from a polypropylene material. However, these can be fabricated from any material which is chemically inert to the battery acid and have sufficient resiliency so that the vent plugs can be slightly deformed during installation to compensate for manufacturing tolerances in the location and configuration of the filling ports 34. Thermoplastic, polymeric materials such as olefin polymers including polyethylene, copolymers of propylene and ethylene and acrylonitrilebutadiene-styrene (ABS), can be used as they are readily molded by conventional techniques such as injection molding at high production rates. Various pigments can be admixed with plastic material prior to molding to obtain desired colors.

While a single diffuser 23 and 223 are employed in conjunction with chambers 36 and 236, it should be understood that more than one such diffusers and chambers can be fabricated in a single gang vent assembly 10 and 210 by placing them between cell vent openings 18*a*, *b* and *c*.

A gang vent cap with three engaging portions and a single vent with one engaging portion has been disclosed. The flame extinguishing compartment of this invention is operable with any number of vent engaging portions in a single unit the only limitation being that the number of engaging portions match the number of battery vent openings.

It will thus be seen that in view of the present invention, there is now provided a vent plug of the single or multiple type for a storage battery which affords a high degree of venting of the cell members and at the same time affords positive retention and drainback of the electrolyte. The vent plug is easily molded from readily available materials and affords diffusion of gases before venting them to the outside of the plug assembly. A flame extinguishing chamber acts in conjunction with the diffuser to disrupt the flow of gases in the vicinity of the diffuser and reduces any explosion hazards. The diffuser is positioned in a manner so that foreign materials will not interfere with its function and is sealed to prevent tampering or removal with the flame extinguishing chamber offered as a safety measure.

Others may practice the invention in any of the numerous ways which will be suggested by this disclosure to one skilled in the art by employing one or more of the novel features disclosed or equivalents thereof. All such practice of the invention is considered to be a part hereof provided it falls within the scope of the appended claims.

I claim:

1. A vent plug for a storage battery filling vent comprising a hollow body member composed of a base, a peripheral wall and a cover; a vent closure engaging portion extending from said base having an opening disposed in said engaging portion and in communication with said hollow body member; partition means extending substantially across said hollow body member; a porous diffuser disposed in said hollow body and in communication with said vent closure opening, said partition means arranged to afford obstruction to the passage of any liquid electrolyte from said vent closure opening to said diffuser; said hollow body member defining a compartment spaced from and in communication with said porous diffuser and having an elongated outlet opening to the outside of said hollow body member, the ratio of the volume in cubic inches of said compartment to the area of said elongated outlet in square inches being within the range of 2:1 to 5:1, said elongated outlet in said compartment being of a smaller cross sectional area than the cross sectional area of said compartment and extending over a substantial distance of said compartment so as to permit an ignition of battery cell vent gases in said compartment to effect controlled rapid expansion whereby any flame is extinguished.

2. The vent plug as defined in claim 1 wherein said vent closure engaging portion includes a plurality of said engaging portions to form a multiple vent plug assembly, at least one said diffuser and compartment, with said partition means extending laterally across said hollow body member.

3. The multiple vent plug assembly as defined in claim 2 wherein a single said compartment and a single said porous diffuser are disposed in said vent plug and between two of said vent closure openings.

4. The vent plug as defined in claim 1 wherein said diffuser is composed of a porous ceramic stone.

5. The vent plug as defined in claim 1 wherein said diffuser is composed of a microporous polyolefin material.

6. The multiple vent plug assembly as defined in claim 2 wherein the base is constructed with a gabled floor with said vent closure openings disposed at the lowest portion of said gables.

7. The multiple vent plug assembly as defined in claim 2 wherein said vent closure openings are formed from a tubular member and the end portion of the tubular member terminates at an oblique angle.

8. The multiple vent plug assembly as defined in claim 2 wherein said partition means includes linear and curved wall baffle sections extending from said base and said linear baffles extend from the cover terminating a short distance from the base to provide a passage therebetween.

9. The multiple vent plug assembly as defined in claim 2 further including another compartment having four wall sections engaging the top of said diffuser to seal said porous diffuser in said assembly.

10. The multiple vent plug assembly as defined in claim 2 wherein said opening in said compartment is of a slotted configuration having a width in the range of about .020 to about .040 inch.

11. The multiple vent plug assembly as defined in claim 10 wherein said compartment has a volume in the range of about .0124 to about .050 cubic inches.

12. The multiple vent plug assembly as defined in claim 11 wherein said diffuser has an open pore volume in the range of about one-half to twice the volume of said compartment.

13. The multiple vent plug assembly as defined in claim 2 wherein said compartment includes a tapered floor and an extending portion disposed adjacent said outlet.

14. The vent plug assembly as defined in claim 1 wherein said vent plug assembly is composed of a polymeric, thermoplastic material.

15. The vent plug as defined in claim 1 wherein said plug is of unitary construction and said compartment is disposed above said diffuser and in said cover.

16. The vent plug as defined in claim 15 wherein said outlet comprises two outlets positioned diametrically opposite to each other in said cover.

17. The vent plug as defined in claim 16 wherein said partition means includes a substantially T-shaped tubular baffle member disposed internally of said hollow body member and spaced from said opening in said engaging portion and said peripheral wall.

18. The vent plug as defined in claim 15 wherein said compartment has a single outlet opening to the outside of said hollow body member.

19. The vent plug as defined in claim 18 wherein said partition means includes disc type baffle members disposed internally of said hollow body member.

20. A vent plug for a storage battery filling vent comprising a hollow body member composed of a base, a peripheral wall, and a cover; a vent closure engaging portion extending from said base having an opening disposed in said engaging portion and in communication with said hollow body member; a porous diffuser disposed in said hollow body and in communication with said vent closure opening; said hollow body member having a compartment spaced from and in communication with said porous diffuser, said compartment having an elongated outlet opening to the outside of said hollow body member, the ratio of the volume in cubic inches of said compartment to the cross sectional area of said elongated outlet in square inches being within the range of 2:1 to .5:1, said elongated outlet being of a smaller cross sectional area than the cross sectional area of said compartment.

21. The vent plug as defined in claim 20 wherein said vent closure engaging portion includes a plurality of said engaging portions to form a multiple vent plug assembly, and at least one said diffuser and compartment.

* * * * *